US 6,727,671 B2

(12) United States Patent
Ito et al.

(10) Patent No.: US 6,727,671 B2
(45) Date of Patent: Apr. 27, 2004

(54) CONTROL SYSTEM FOR ELECTRIC POWER STEERING APPARATUS

(75) Inventors: Norihisa Ito, Anjo (JP); Hideki Amakusa, Tokai (JP); Atsushi Sato, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/383,756

(22) Filed: Mar. 10, 2003

(65) Prior Publication Data

US 2003/0169005 A1 Sep. 11, 2003

(30) Foreign Application Priority Data

Mar. 11, 2002 (JP) ....................... 2002-065589
Jan. 20, 2003 (JP) ....................... 2003-011051

(51) Int. Cl.[7] ............................................. H02P 7/00
(52) U.S. Cl. ..................... 318/432; 318/433; 318/434
(58) Field of Search ......................... 180/446; 318/432, 318/434, 433

(56) References Cited

U.S. PATENT DOCUMENTS 5,740,040 A * 4/1998 Kifuku et al. ............... 701/41
5,999,869 A * 12/1999 Nishimoto et al. .......... 701/41
6,102,151 A * 8/2000 Shimizu et al. ............. 180/446
6,505,702 B1 * 1/2003 Shinmura et al. ........... 180/446
2002/0023798 A1   2/2002 Amakusa et al.
2002/0172509 A1   11/2002 Kameya et al.

* cited by examiner

Primary Examiner—Karen Masih
(74) Attorney, Agent, or Firm—Posz & Bethards, PLC

(57) ABSTRACT

A control system for an electric power steering apparatus detects calculation anomalies in a CPU regardless of the magnitude of a modified control quantity. The CPU has a basic control quantity calculating means for calculating a basic control quantity to drive a motor based on an output from a torque sensor, and a modified control quantity calculating means for calculating a modified control quantity corresponding to the steering conditions (for example, steering speed) of the steering wheel. The CPU-calculation monitoring unit has a first anomaly deciding means for deciding whether the calculation result of the basic control quantity calculating means is normal or anomalous in light of the output from the torque sensor, and a second anomaly deciding means for deciding whether the calculation result of the modified control quantity calculating means is normal or anomalous in light of the steering conditions. The motor is deactivated if anomalies are detected.

12 Claims, 5 Drawing Sheets

CONTROL SYSTEM FOR ELECTRIC POWER STEERING APPARATUS

CROSS REFERENCE TO RELATED APPLICATION

This application is based upon, claims the benefit of priority of, and incorporates by reference, the contents of prior Japanese Patent Application No. 2002-65589 filed Mar. 11, 2002 and No. 2003-11051 filed Jan. 20, 2003.

BACKGROUND OF THE INVENTION

1. Field of the Invention

The present invention relates to a control system for electric power assisted steering apparatuses that use a motor.

2. Description of the Related Art

Generally, electric power assisted steering has been commercialized to help the driver with rotation of the steering wheel by utilizing motor torque. This apparatus calculates a control current to be provided to the assist motor in accordance with the torque (output from the torque sensor) needed for rotation of the steering wheel. Thus, if the CPU in the ECU that calculates this control current provides the wrong output because of a CPU problem or the like, the motor assist falls short or exceeds the appropriate level, and steering with the steering wheel becomes more difficult.

To solve this problem, Japanese Patent Laid-Open Publication No. 2002-67988 discloses a technique for deactivating the steering assist system unless a CPU calculation result falls in a predetermined range of the torque sensor output, deciding that a calculation problem has arisen (see pages 2–4, FIGS. 4 and 5 in this publication).

Presently, to improve steering performance, a damping correction is carried out to correct the extent of motor assist based on the steering speed, for example. In this case, the control current for steering assist is calculated by adding a basic control quantity calculated in correspondence to the steering torque and a modified control quantity calculated in correspondence to the steering speed. Thus, the magnitude of the control current changes with the modified control quantity in addition to the steering torque.

For example, if the modified control quantity is set at a large value, the control current calculated from the output of the torque sensor goes beyond the predetermined range despite correct calculation by the CPU. In turn, if the predetermined range is set to avoid such a problem, calculation problems, if any, may not be detected, and concern arises that the steering assist system cannot be deactivated in case of an anomalous calculation.

SUMMARY OF THE INVENTION

The present invention has been made to solve such problems, and an object of the present invention is to provide a control system for the electric power steering apparatus that has a CPU monitoring means for reliably detecting calculation problems in the CPU regardless of the magnitude of modified control.

According to one aspect of the present invention, a control system for an electric power steering apparatus includes a control current calculating means (means for calculating an assist current) for calculating an assist current to be provided to a motor that assists a steering and monitoring means for monitoring calculation by the control current calculating means. This control current calculating means has a basic control quantity calculating means for calculating a basic control quantity for the assist current from a steering torque of a steering wheel, and a modified control quantity calculating means for calculating a modified control quantity to correct the basic control quantity based on steering conditions of the steering wheel. The monitoring means has a first anomaly deciding means for deciding whether the calculation result of the basic control quantity calculating means is normal or anomalous in light of the steering torque of the steering wheel and a second anomaly deciding means for deciding whether the calculation result of the modified control, quantity calculating means is normal or anomalous in light of the steering conditions of the steering wheel.

According to this configuration, it becomes possible to decide whether the calculation results are normal or anomalous by monitoring the calculation result of the basic control quantity calculating means and that of the modified control quantity calculating means, separately. The first anomaly deciding means decides whether the calculation result of the basic control quantity calculating means is normal or anomalous only in light of the steering torque of the steering wheel. Meanwhile, the second anomaly deciding means decides whether the calculation result of the modified control quantity calculating means is normal or anomalous only in light of the steering conditions of the steering wheel. It becomes thereby possible to detect with reliability any anomaly in each calculating means, regardless of the magnitude of the modified control quantity.

According to a second aspect of the invention, the control system according to the first aspect has a motor driving circuit for power assist, and the motor driving circuit deactivates the motor if at least either the first anomaly deciding means or the second anomaly deciding means detects an anomaly. In other words, when it is decided that any one of the basic control quantity and the modified control quantity calculated by the respective calculating means is anomalous, the motor is deactivated. Then it becomes possible to prevent the wrong torque assist of the motor in the event of an anomalous calculation.

According to a third aspect of the invention, in the control system according to the first aspect of the invention, the second anomaly deciding means decides the calculation result of the modified control quantity calculating means as an anomaly if the modified control quantity is equal to or larger than a prescribed value, such as an upper limit. Then whether the calculation result of the modified control quantity calculating means is normal or anomalous can be decided by a simple monitoring of the upper limit, and a simplified logic circuit can be adopted in the second anomaly deciding means.

According to a fourth aspect of the invention, the control system of the first aspect further comprises a third anomaly deciding means for deciding whether the motor driver signal provided by the motor driving circuit to the motor is normal or anomalous in light of the assist current. According to this configuration, whether the motor driver signal is normal or anomalous can be decided in light of the assist current provided by the control current calculating means. Then a calculation problem that may arise during calculation of the motor driver signal based on the assist current can be reliably detected.

According to a fifth aspect of the invention, in the control system of the fourth aspect, the motor driving circuit deactivates the motor if at least one of the first anomaly deciding means, the second anomaly deciding means, or the third anomaly deciding means detects an anomaly. If one of the basic control quantities calculated by the basic control quantity calculating means, the modified control quantity calculated by the modified control quantity calculating means and the motor driver signal calculated based on the assist current is decided as anomalous, the motor is deactivated. Then motor torque assist based on an anomalous calculation can be prevented, and improved driving can be ensured.

According to a sixth aspect of the invention, in the control system of the fourth aspect, one of the first anomaly deciding means, the second anomaly deciding means, and the third anomaly deciding means is built in a custom IC. Then a monitoring section (anomaly deciding means) can be provided by an inexpensive custom IC along with the first and third anomaly deciding means to which logic circuits are applicable. All of the above means for performing an operation are also operational as specific devices.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment(s) is merely exemplary in nature and is in no way intended to limit the invention, its application, or uses.
(First Embodiment)

Figure 1:
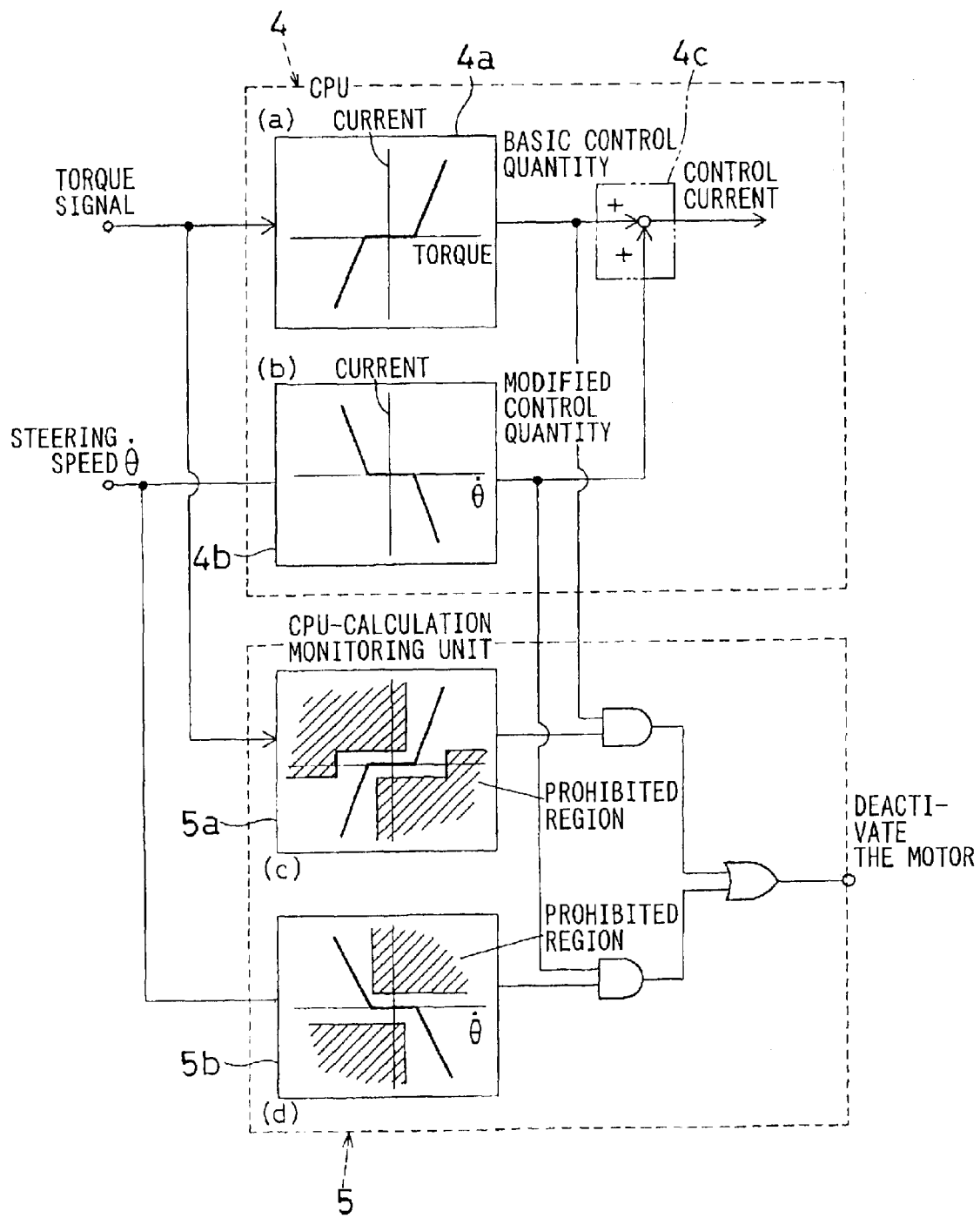
FIG. 1 is a schematic diagram illustrating a control system for electric power steering apparatuses according to an embodiment of the present invention.

Now a first embodiment of the invention will be described with reference to the accompanying drawings. FIG. 1 is a schematic diagram illustrating a control system for electric power steering apparatuses.

Figure 2:
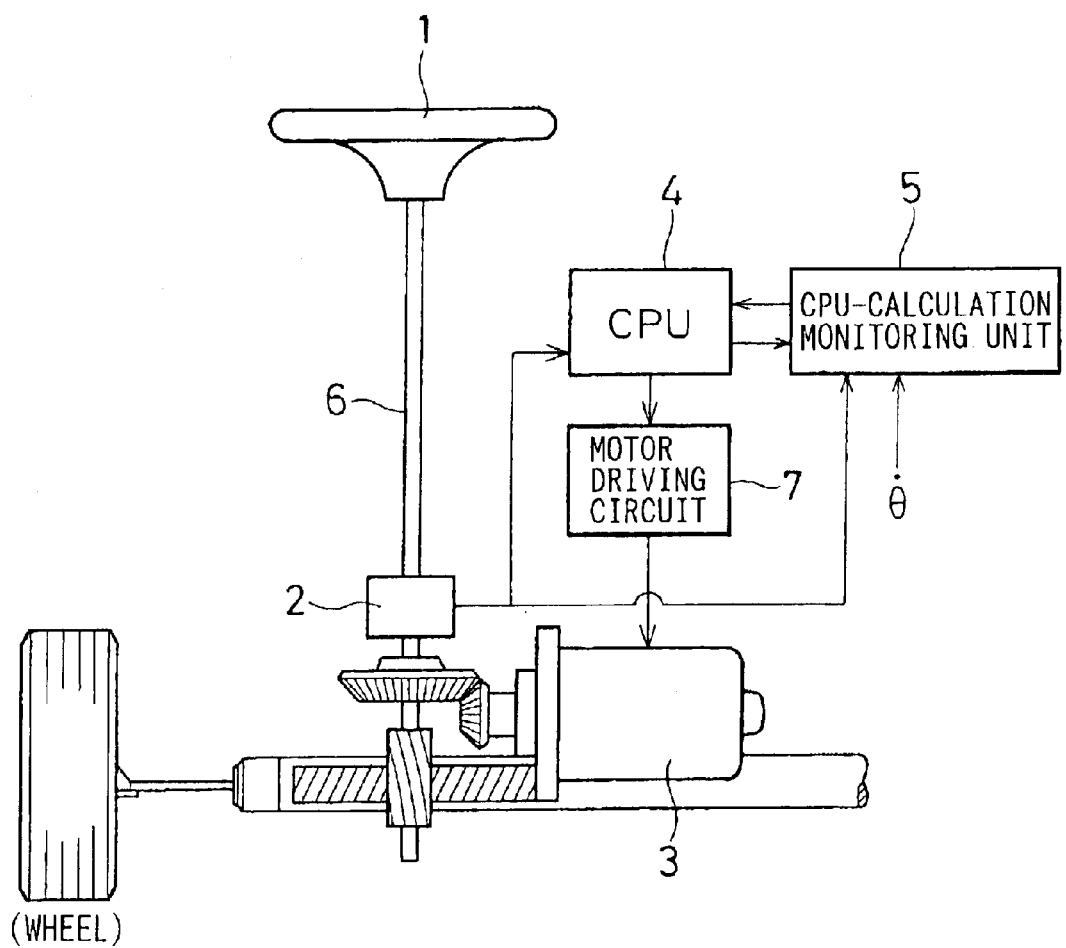
FIG. 2 is a diagram illustrating the structure of the electric power steering apparatus according to an embodiment of the present invention.

The electric power steering apparatus (hereinafter, called EPS) of the embodiment includes, as shown in FIG. 2, a torque sensor 2 that detects the steering torque of the steering wheel 1, a motor 3 that assists the driver to rotate the steering wheel 1, a motor control device (to be described later) that controls the motor 3, and a CPU-calculation monitoring unit 5 (to be described later) that monitors the calculation result of a CPU 4 used in the motor control device.

The torque sensor 2 converts the steering torque, which is applied to the steering shaft 6 during rotation of the steering wheel 1, into an electric signal, for example, voltage, as output. The motor control device includes the CPU 4 that calculates the motor assist current (control current) and a motor driving circuit 7 that drives the motor 3 based on the assist current calculated by the CPU 4, as shown in FIG. 2.

The motor driving circuit 7 is, for example, an H-shaped bridge circuit composed of four FETs (not shown), and drives the motor 3 by PWN based on the motor driving signal provided by the CPU 4. According to FIG. 1, the CPU 4 has a basic control quantity calculating means 4a for calculating the basic control quantity for driving the motor 3 based on the output from the torque sensor 2, a modified control quantity calculating means 4b for calculating the modified control quantity to correct the basic control quantity (for example, damping correction) according to the steering conditions of the steering wheel 1, and an adder circuit 4c that calculates a control current (assist current) based on the control quantity calculated by the individual calculating means.

As shown in diagram (a) of FIG. 1, the basic control quantity calculating means 4a has a map showing the relations between the steering torque and the basic control quantity (current) and determines the basic control quantity for each output from the torque sensor 2 by referencing this map. As shown in diagram (b) of FIG. 1, the modified control quantity calculating means 4b has a map showing the relations between the steering speed (theta with a dot above it) of the steering wheel 1 and the modified control quantity (current) and determines the modified control quantity for each steering speed by referencing this map. The steering speed of the steering wheel 1 can be determined from the voltage and current applied to the motor 3.

The CPU-calculation monitoring unit 5 has a first anomaly deciding means 5a that decides whether the calculation result provided by the basic control quantity calculating means 4a is normal or anomalous in light of the steering torque (output from the torque sensor 2) of the steering wheel 1, and a second anomaly deciding means 5b that decides whether the calculation result provided by the modified control quantity calculating means 4b is normal or anomalous in light of the steering conditions of the steering wheel 1.

As shown in diagram (c) of FIG. 1, the first anomaly deciding means 5a has a map with a prohibited region corresponding to a certain steering torque (output from the torque sensor 2). If the calculation result from the basic control quantity calculating means 4a falls in the prohibited region of the map, it decides the calculation result as anomalous.

As shown in diagram (d) of FIG. 1, the second anomaly deciding means 5b has a map with a prohibited region corresponding to a certain steering speed. If the calculation result from the modified control quantity calculating means 4b falls in the prohibited region of the map, it decides the calculation result as anomalous.

Then the control provided by the first embodiment is described below. The CPU 4 determines the basic control quantity with reference to the map for each output (torque signal) from the torque sensor 2, and determines the modified control quantity with reference to the map for each steering speed signal.

The CPU-calculation monitoring unit 5 monitors the calculation results of the basic control quantity calculating means 4a by the first anomaly deciding means 5a, and monitors the calculation results of the modified control quantity calculating means 4b by the second anomaly deciding means 5b. The CPU-calculation monitoring unit 5 determines a control current by adding the basic control quantity and the modified control quantity when the calculation result of the basic control quantity calculating means 4a and that of the modified control quantity calculating means 4b are decided as normal, and generates a motor driving signal based on the decided control current, and then sends the signal to the motor driving circuit 7.

The CPU-calculation monitoring unit 5 generates a stop signal that deactivates the motor 3 and sends it to the motor driving circuit 7 when the unit decides at least either of the calculation result of the basic control quantity calculating means 4a or that of the modified control quantity calculating means 4b as anomalous.

(Effect of the First Embodiment)

The CPU-calculation monitoring unit 5 can monitor the calculation result of the basic control quantity calculating means 4a and that of the modified control quantity calculating means 4b separately, and then decide whether each of the calculation results is normal or anomalous. In other words, the first anomaly deciding means 5a can decide whether the calculation result of the basic control quantity calculating means 4a is normal or anomalous only in light of the steering torque of the steering wheel 1, regardless of the steering conditions (steering speed in this embodiment) of the steering wheel 1. The second anomaly deciding means 5b can decide whether the calculation result of the modified control quantity calculating means 4b is normal or anomalous only in light of the steering conditions of the steering wheel 1, regardless of the steering torque of the steering wheel 1.

As a result, if there is a problem in calculation in the individual calculating means, the control system can reliably detect the problem regardless of the magnitude of the modified control quantity. In addition, if a problem is detected by either the first anomaly deciding means 5a or the second anomaly deciding means 5b, control of the system ceases (the motor 3 is deactivated). Then, torque assist by the motor 3 based on an anomalous calculation is prevented, thereby ensuring safe driving.

(Second Embodiment)

Figure 3:
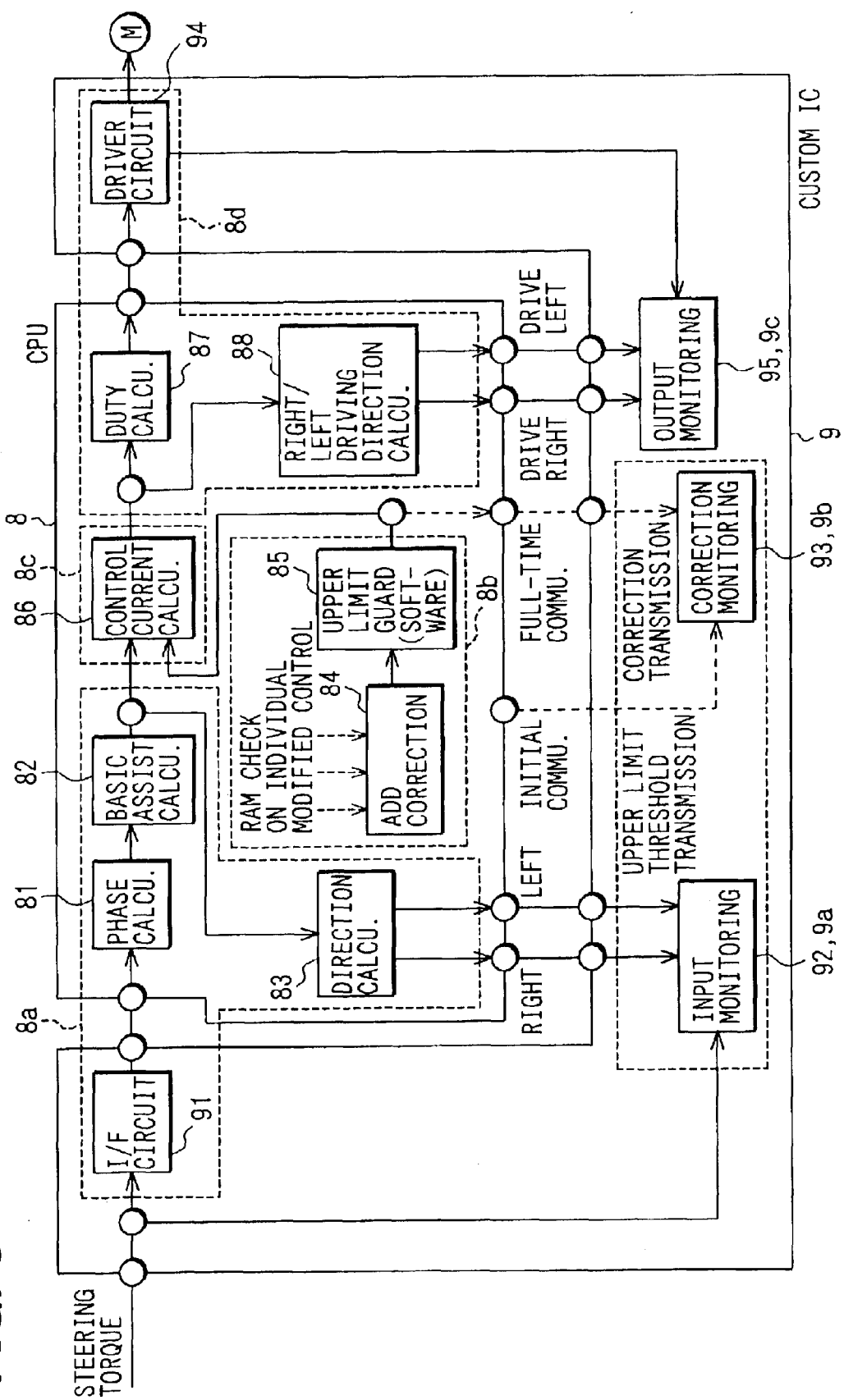
FIG. 3 is a schematic diagram illustrating a CPU and a custom IC constituting the control system of a second embodiment.

Now, a second embodiment of the invention will be described with reference to the drawings. FIG. 3 is a schematic diagram illustrating a CPU 8 and a custom IC 9 constituting the control system of the second embodiment. The other components in the EPS besides the control system are the same as those of the first embodiment as shown in FIG. 2.

The CPU 8 has a phase calculation unit 81, a basic assist calculation unit 82, a direction calculation unit 83, an add correction calculation unit 84, an upper limit guard unit 85, a control current calculation unit 86, a duty calculation unit 87, and a right and left driving direction calculation unit 88. The phase calculation unit 81 calculates a phase based on data provided by digitizing the output (steering torque) from the torque sensor 2 with an I/F circuit 91 that will be described later. The basic assist calculation unit 82 calculates a basic assist (basic control quantity) based on the phase calculated by the phase calculation unit 81. The direction calculation unit 83 provides the direction of assist for steering torque based on the basic assist calculated by the basic assist calculation unit 82.

The add correction calculation unit 84 calculates a modified control quantity that modifies the basic assist in accordance with steering conditions such as steering speed, and performs a RAM check on the quantity. The upper limit guard unit 85 checks if the add correction calculated by the add correction calculation unit 84 exceeds a prescribed upper limit or not with an upper limit guard (software).

The control current calculation unit 86 calculates a control current (assist current) from the basic assist calculated by the basic assist calculation unit 82 and from the add correction calculated by the add correction calculation unit 84. The duty calculation unit 87 converts the control current calculated by the control current calculation unit 86 into an ON and OFF ratio of the control pulse signal (ratio of energizing time: duty ratio). The right and left driving direction calculation unit 88 provides the direction of torque assist by the motor 3 based on the control current calculated by the control current calculation unit 86.

The custom IC 9 has an I/F circuit 91, an input motoring unit 92, a correction monitoring unit 93, a motor driving circuit 94, and an output motoring unit 95. The I/F circuit 91 adjusts the output (steering torque) from the torque sensor 2 and then provides it to the phase calculation unit 81 of the CPU 8. The input motoring unit 92 checks if the direction of assist for steering torque is right or wrong based on the output from the direction calculation unit 83 and output (steering torque) from the torque sensor 2. The correction motoring unit 93 checks if the add correction constantly provided since the initial check exceeds the upper limit guard (upper limit) provided by the CPU 8 upon initial check (upon start-up of EPS control). The motor driving circuit 94 provides current (motor driver signal) based on the control pulse signal sent from the duty calculation unit 87 to drive the motor 3. The output motoring unit 95 checks if the direction of assist by the motor 3 is right or wrong based on the output from the right and left driving direction calculation unit 88 and the output from the motor driving circuit 94.

As shown in FIG. 3, the I/F circuit 91, the phase calculation unit 81, the basic assist calculation unit 82, and the direction calculation unit 83 constitute a basic control quantity calculating means 8a that calculates a basic control current (basic assist) based on the steering force (steering torque) of the steering wheel 1. The add correction calculation unit 84 and the upper limit guard unit 85 constitute a modified control quantity means 8b that calculates the modified control quantity (add correction) in accordance with the steering conditions of the steering wheel 1. Further, the control current calculation unit 86 constitutes an adder means 8c, while the duty calculation unit 87, the right and left driving direction calculation unit 88, and the motor driving circuit 94 constitute a motor driver signal output means 8d.

Meanwhile, the input monitoring unit 92 forms a first anomaly deciding means 9a that decides whether the calculation result of the basic control quantity calculating means 8a is normal or anomalous in light of the steering force (steering torque) of the steering wheel 1. The correction monitoring unit 93 forms a second anomaly deciding means 9b that decides the calculation result of the modified control quantity calculating means 8b as anomalous if the modified control quantity calculated by the modified control quantity calculating means 8b exceeds a prescribed upper limit. The output monitoring unit 95 forms a third anomaly deciding means 9c that decides whether the motor driver signal sent from the motor driving circuit 94 to the motor 3 is normal or anomalous in light of the assist current (control current) calculated by the adder means 8c.

Figure 4:
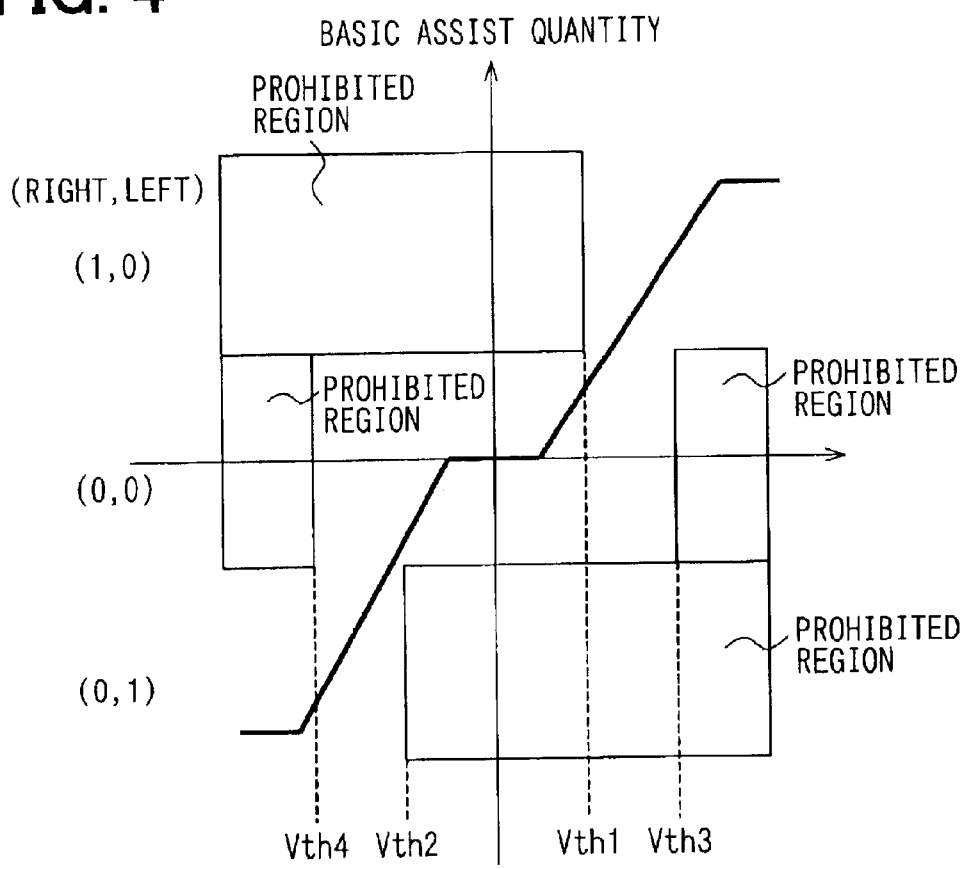
FIG. 4 is an input monitoring map that shows prohibited regions for the basic control quantity (basic assist) of the second embodiment.

The input monitoring unit 92 (first anomaly deciding means 9a) has an input monitoring map where prohibited regions have been specified as shown in FIG. 4. If the calculation result of the basic control quantity calculating means 8a falls in a prohibited region, the input monitoring unit 92 decides the calculation result as anomalous, generates a deactivation signal for deactivating the motor 3, and sends this signal to the motor driving circuit 7.

The direction of the basic torque assist calculated by the direction calculation unit 83 is sent to the input monitoring unit 92 in the form of a 2-bit signal of either CW or CCW (clockwise or counter-clockwise). Namely, each in (Right, Left) is expressed by 0 or 1.

Based on the 2-bit signal of the basic assist and steering torque (output of the torque sensor 2), prohibited regions are determined in the input monitoring map. Specifically, if the 2-bit signal is (1, 0), the area where steering torque$\leq$Vth1 becomes a prohibited region. If the 2-bit signal is (0, 0), the areas where steering torque$\leq$Vth4 or Vth3$\leq$steering torque become prohibited regions. If the 2-bit signal is (0, 1), the area where Vth2$\leq$steering torque becomes a prohibited region.

Figure 5:
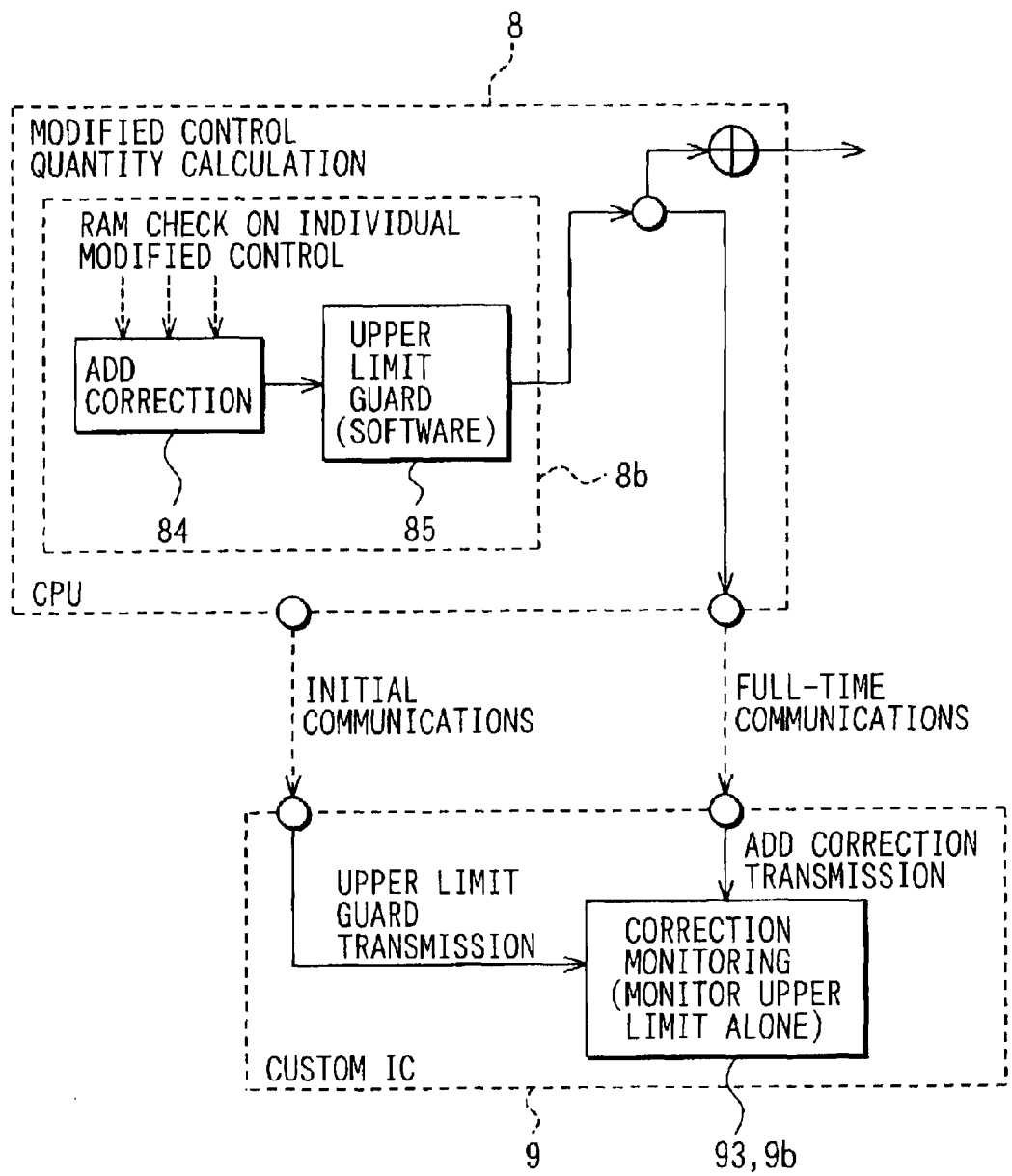
FIG. 5 is a schematic diagram illustrating a monitoring means (second anomaly deciding means) that monitors the modified control quantity (add correction) of the second embodiment.

Referring to FIG. 5, the correction monitoring unit 93 (second anomaly deciding means 9b) checks if the add correction constantly sent since the system start-up (start of EPS control) is equal to or more than the upper limit guard (upper limit threshold) sent from the CPU 8 upon the system start-up. If the add correction is equal to or more than the upper limit guard, the modified control quantity calculating means 8b decides the add correction as anomalous, generates a deactivation signal for deactivating the motor 3, and sends this signal to the motor driving circuit 7.

Figure 6:
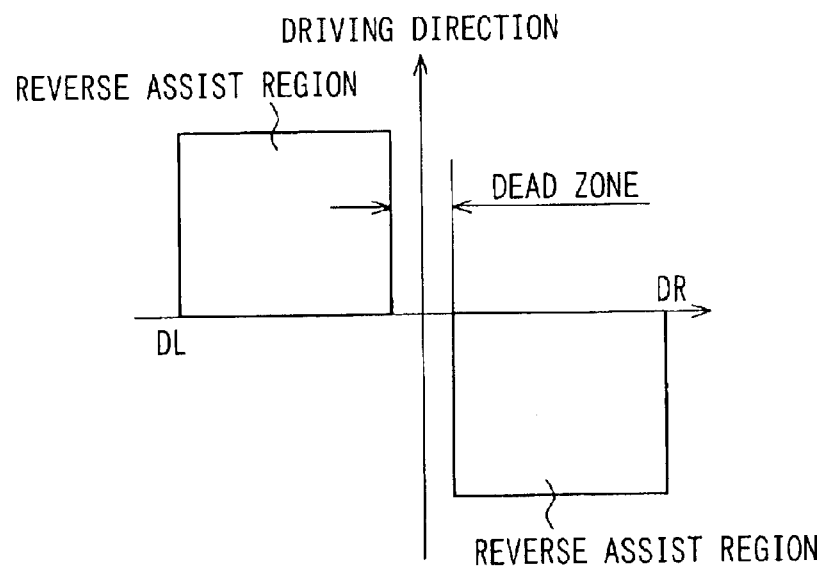
FIG. 6 is an output monitoring map that shows the reverse assist regions for the motor driver signal of the second embodiment.

Referring now to FIG. 6, the output monitoring unit 95 (third anomaly deciding means 9c) has an output monitoring map where reverse assist regions have been specified. If the output from the motor driver signal output means 8d falls in a reverse assist region, it decides the output as an anomalous value, generates a deactivation signal for deactivating the motor 3, and sends this signal to the motor driving circuit 7.

The direction of torque assist by the motor 3, which is provided by the right and left driving direction calculation unit 88 based on the control current (assist current), is sent to the output monitoring unit 95 to indicate right drive (DR), left drive (DL) or dead zone. In the output monitoring map, the reverse assist regions are specified in accordance with the signal indicating the assist direction of the assist current—right drive (DR), left drive (DL) or dead zone— and the driving direction of the motor driver signal sent from the motor driving circuit 94. If the assist direction is left drive (DL), the area above the lateral axis (area indicating right drive) becomes a reverse assist region, while if the assist direction is right drive (DR), the area below the lateral axis (area indicating left drive) becomes a reverse assist region.

(Effect of the Second Embodiment)

Because the second anomaly deciding means 9b has been replaced by the simple correction monitoring unit 93 that monitors the upper limit, a simplified logic circuit can be adopted in the second anomaly deciding means 9b. Since a modified control quantity can be calculated by various methods and those methods are modified to adapt to each control system, the monitoring method for the modified control quantity (add correction) must use a micro computer suited to flexible adjustment.

In this embodiment, however, a simple correction monitoring unit 93 that monitors the upper limit alone is employed. Thus a simplified logic circuit can be adopted in the second anomaly deciding means 9b. Furthermore, it becomes possible to form a monitoring unit (anomaly deciding means) using an inexpensive custom IC 9 along with the first anomaly deciding means 9a (input monitoring unit 92) and the third anomaly deciding means 9c (output monitoring unit 95) that can be realized by logic circuits.

Further in this embodiment, the third anomaly deciding means 9c (output monitoring unit 95) is provided to check if the motor driver signal provided by the motor driving circuit 94 is normal or anomalous in light of the assist current (control current). Then, the motor driver signal can be decided as normal or anomalous with reference to the assist current. It thereby becomes possible to detect an output anomaly, if any, that may arise when a motor driver signal is produced from the assist current.

In addition, the steering control system is deactivated (the drive of the motor 3 is prohibited) if at least one of the first anomaly deciding means 9a, the second anomaly deciding means 9b, or the third anomaly deciding means 9c detects an anomaly. Thus, torque assist for the motor 3 based on an anomalous calculation can be prevented, and driving is further enhanced.

(Embodiment Variation)

The CPU-calculation monitoring unit 5 in the first embodiment may be a micro computer or a logic circuit. In the above embodiment, the steering speed of the steering wheel 1 is detected by voltage and current applied to the motor 3. However, it can be known by, for example, differentiating the steering angle of the steering wheel 1. Furthermore, in the above embodiment, the damping control was adopted as an example of control correction. However, the present invention can be applied even when a control correction other than damping control is adopted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for an electric power steering apparatus, comprising:

a motor for assisting a driver in operating a steering wheel;

means for calculating an assist current to be provided to the motor;

a motor driving circuit for driving the motor based on the assist current; and means for monitoring a calculation result of the means for calculating an assist current, wherein the means for calculating an assist current further comprises:

means for calculating a basic control quantity for the assist current from a steering torque of the steering wheel; and means for calculating a modified control quantity to correct the basic control quantity based on steering conditions of the steering wheel, wherein the monitoring means further comprises:

means for deciding, as a first anomaly, whether the calculation result of the basic control quantity calculating means is normal or anomalous in light of the steering torque of the steering wheel; and means for deciding, as a second anomaly, whether the calculation result of the modified control quantity calculating means is normal or anomalous in light of the steering conditions of the steering wheel.

2. The control system for an electric power steering apparatus according to claim 1, wherein said motor driving circuit deactivates the motor if at least either the first anomaly deciding means or the second anomaly deciding means detects an anomaly.

3. The control system for an electric power steering apparatus according to claim 1, wherein said second anomaly deciding means decides the calculation result of said modified control quantity calculating means as an anomaly if said modified control quantity is equal to or larger than a prescribed upper limit.

4. The control system for an electric power steering apparatus according to claim 1, further comprising:
means for deciding, as a third anomaly, whether a motor driver signal provided by said motor driving circuit to the motor is normal or anomalous in light of the assist current.

5. The control system for an electric power steering apparatus according to claim 4, wherein said motor driving circuit deactivates the motor if at least one of the first anomaly deciding means, the second anomaly deciding means, or the third anomaly deciding means detects an anomaly.

6. The control system for an electric power steering apparatus according to claim 4, wherein the first anomaly deciding means, the second anomaly deciding means, and the third anomaly deciding means are built in a custom IC.

7. A control system for an electric power steering apparatus, comprising:
a motor for power assisting operation of a steering wheel;
an assist current calculating device to provide the assist current to the motor;
a motor driving circuit for driving the motor based on the assist current; and
a calculation result monitoring device for monitoring the assist current calculating device,
wherein the assist current calculating device further comprises:
a basic control quantity calculating device that calculates a basic control quantity for the assist current based upon a steering torque of the steering wheel; and
a modified control quantity calculating device that calculates a modified control quantity to correct the basic control quantity based on steering conditions of the steering wheel,
wherein the monitoring device further comprises:
a first anomaly deciding device that decides whether the calculation result of the basic control quantity calculating device is normal or anomalous in light of the steering torque of the steering wheel; and
a second anomaly deciding device that decides whether the calculation result of the modified control quantity calculating device is normal or anomalous in light of the steering conditions of the steering wheel.

8. The control system for an electric power steering apparatus according to claim 7, wherein said motor driving circuit deactivates the motor if at least either the first anomaly deciding device or the second anomaly deciding device detects an anomaly.

9. The control system for an electric power steering apparatus according to claim 7, wherein said second anomaly deciding device decides the calculation result of said modified control quantity calculating device as an anomaly if said modified control quantity is equal to or larger than a prescribed upper limit.

10. The control system for an electric power steering apparatus according to claim 7, further comprising:
a third anomaly detecting device that decides whether a motor driver signal provided by said motor driving circuit to the motor is normal or anomalous in light of the assist current.

11. The control system for an electric power steering apparatus according to claim 10, wherein said motor driving circuit deactivates the motor if at least one of the first anomaly deciding device, the second anomaly deciding device, or the third anomaly deciding device detects an anomaly.

12. The control system for an electric power steering apparatus according to claim 10, wherein the first anomaly deciding device, the second anomaly deciding device, and the third anomaly deciding device are built in a custom IC.

* * * * *